United States Patent
Russell et al.

(10) Patent No.: US 11,110,350 B2
(45) Date of Patent: Sep. 7, 2021

(54) MULTIPLAYER TELEPORTATION AND SUMMONING

(71) Applicant: Intuitive Research and Technology Corporation, Huntsville, AL (US)

(72) Inventors: Kyle Russell, Huntsville, AL (US); Chanler Crowe, Madison, AL (US); Michael Jones, Athens, AL (US); Michael Yohe, Meridianville, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 0 days.

(21) Appl. No.: 16/702,015

(22) Filed: Dec. 3, 2019

(65) Prior Publication Data

US 2020/0171387 A1    Jun. 4, 2020

Related U.S. Application Data

(60) Provisional application No. 62/774,571, filed on Dec. 3, 2018.

(51) Int. Cl.
| | | |
|---|---|---|
| *A63F 13/56* | (2014.01) | |
| *A63F 13/35* | (2014.01) | |
| *G06F 3/01* | (2006.01) | |
| *H04L 29/06* | (2006.01) | |

(52) U.S. Cl.
CPC ............. *A63F 13/56* (2014.09); *A63F 13/35* (2014.09); *G06F 3/011* (2013.01); *H04L 67/38* (2013.01)

(58) Field of Classification Search
CPC .......... A63F 13/56; A63F 13/35; G06F 3/011; H04L 67/38
USPC .......................................................... 463/42
See application file for complete search history.

(56) References Cited

U.S. PATENT DOCUMENTS

| | | |
|---|---|---|
| 5,736,982 A | 4/1998 | Suzuki et al. |
| 8,187,085 B2 | 5/2012 | Coleman et al. |
| 8,334,871 B2 | 12/2012 | Hamilton, II et al. |
| RE44,054 E | 3/2013 | Kim |
| 8,732,593 B2 | 5/2014 | Van Wie et al. |
| 8,951,123 B2 | 2/2015 | Waugaman et al. |
| 9,110,567 B2 | 8/2015 | Leahy et al. |
| 9,123,157 B2 | 9/2015 | Shuster et al. |
| 9,402,057 B2 | 7/2016 | Kaytaz et al. |
| 9,411,490 B2 | 8/2016 | Van Wie et al. |
| 9,466,142 B2 | 10/2016 | Du et al. |
| 9,686,512 B2 | 6/2017 | Leibovich et al. |
| 9,936,165 B2 | 4/2018 | Li et al. |
| 2007/0288598 A1 | 12/2007 | Edeker et al. |
| 2009/0163278 A1* | 6/2009 | Kawanaka ............. G06Q 10/00 463/40 |
| 2009/0286605 A1* | 11/2009 | Hamilton, II .......... G06N 3/006 463/42 |

(Continued)

*Primary Examiner* — Allen Chan
(74) *Attorney, Agent, or Firm* — Angela Holt; Frank M. Caprio; Bradley Arant Boult Cummings LLP

(57) ABSTRACT

In a method according to the present disclosure a user in a virtual reality space identifies a desired location for moving another user within the space. The desired location is tested for suitability for teleportation or summoning. A list of clients available for moving to the desired location is identified and stored. The user selects one or more clients to move to the desired location, and the selected clients are summoned to the desired location.

9 Claims, 6 Drawing Sheets

(56) References Cited

U.S. PATENT DOCUMENTS

2010/0070859 A1* 3/2010 Shuster .................. A63F 13/79
   715/706
2012/0115603 A1* 5/2012 Shuster .................. A63F 13/12
   463/31

* cited by examiner

MULTIPLAYER TELEPORTATION AND SUMMONING

REFERENCE TO RELATED APPLICATIONS

This application claims priority to Provisional patent application U.S. Ser. No. 62/774,571, entitled "Multiplayer Teleportation and Summoning" and filed on Dec. 3, 2018, which is fully incorporated herein by reference.

BACKGROUND AND SUMMARY

The present disclosure generally relates to utilization of networked computer systems, particularly to enable a plurality of users to operate within the same virtual reality environment.

Use of virtual technology has become increasingly utilized for a variety of purposes in addition to gaming, such as: education, development, and research. Virtual reality programs that allow image manipulation for education, development, and research can provide numerous opportunities for visualization of problems in unique ways that can offer unique solutions. However, increased software functionality can break increased difficulty and confusion for inexperienced users.

What is needed is the development of methods enabling an experienced virtual reality user to host inexperienced users in a multiplayer virtual environment provides greater ease for inexperienced users to learn to use the virtual reality software and successfully experience the virtual reality environment.

The method according to the present disclosure solves the above problems by providing a method in multiplayer for an experienced user to host a less experienced user. The host can observe the actions of the inexperienced user's avatar in virtual reality. The host may then manipulate the location of the inexperienced user's avatar. The host may teleport or summon the other user's avatar. The term "teleportation" when used herein describes a user moving the user's own avatar in a virtual space. The term "summoning" when used herein describes the user moving the avatars of other users in the virtual space.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

In some embodiments of the present disclosure, the operator may use a virtual controller to manipulate three-dimensional mesh. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds.

Figure 1:
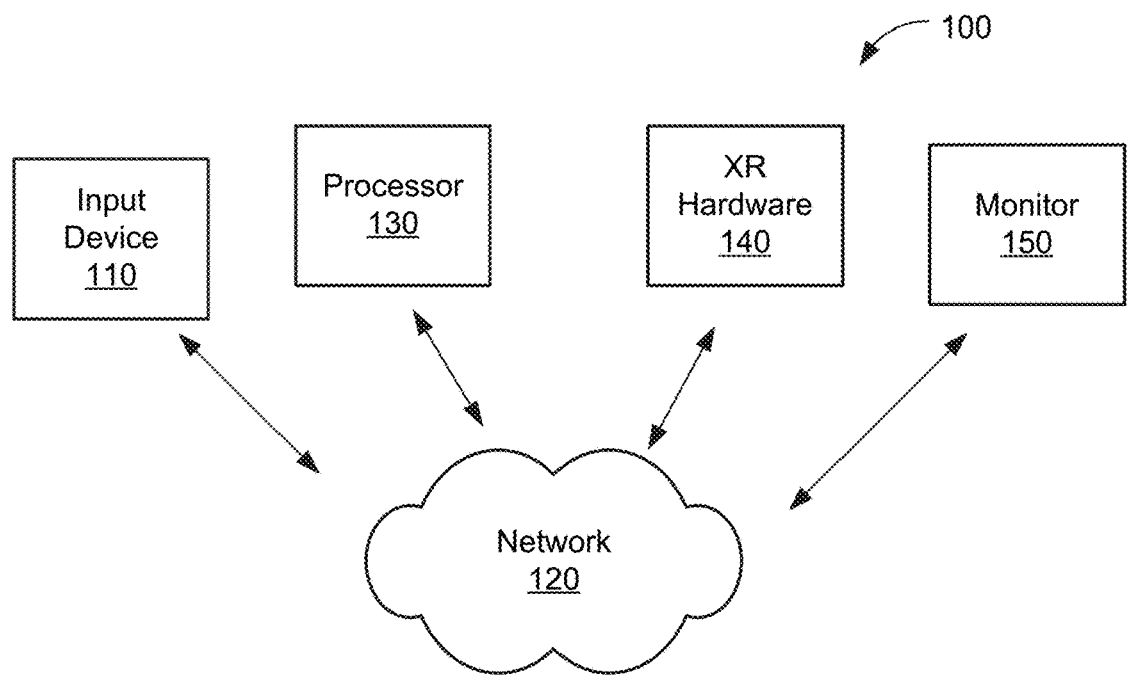
FIG. 1 is a system for allowing a more experienced virtual reality user to host a less experienced virtual reality user according to an exemplary embodiment of the present disclosure.

FIG. 1 depicts a system 100 for allowing a virtual reality user to "host" another virtual reality user, according to an exemplary embodiment of the present disclosure. The system 100 comprises an input device 110 communicating across a network 120 to a processor 130. The input device 110 may comprise, for example, a keyboard, a switch, a mouse, a joystick, a touch pad and/or other type of interface, which can be used to input data from a user of the system 100. The network 120 may be of any type network or networks known in the art or future-developed, such as the internet backbone, Ethernet, Wifi, WiMax, and the like. The network 120 may be any combination of hardware, software, or both. XR hardware 140 comprises virtual or mixed reality hardware that can be used to visualize a three-dimensional world. A video monitor 150 is used to display a VR space to a user. The input device 110 receives input from the processor 130 and translates that input into an XR event or function call. The input device 110 allows a user to input data to the system 100, by translating user commands into computer commands.

Figure 2:
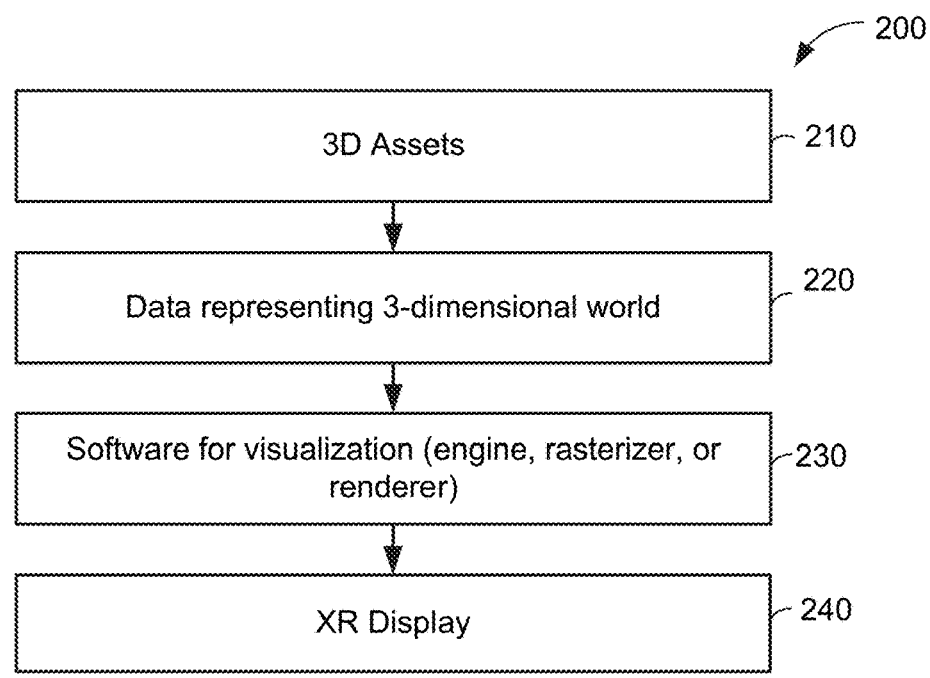
FIG. 2 illustrates the relationship between three-dimensional assets, the data representing those assets, and the communication between that data and the software, which leads to the representation on the XR platform.

FIG. 2 illustrates the relationship between three-dimensional assets 210, the data representing those assets 220, and the communication between that data and the software, which leads to the representation on the XR platform. The three-dimensional assets 210 may be any three-dimensional assets, which are any set of points that define geometry in three-dimensional space.

The data representing a three-dimensional world 220 is a procedural mesh that may be generated by importing three-dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
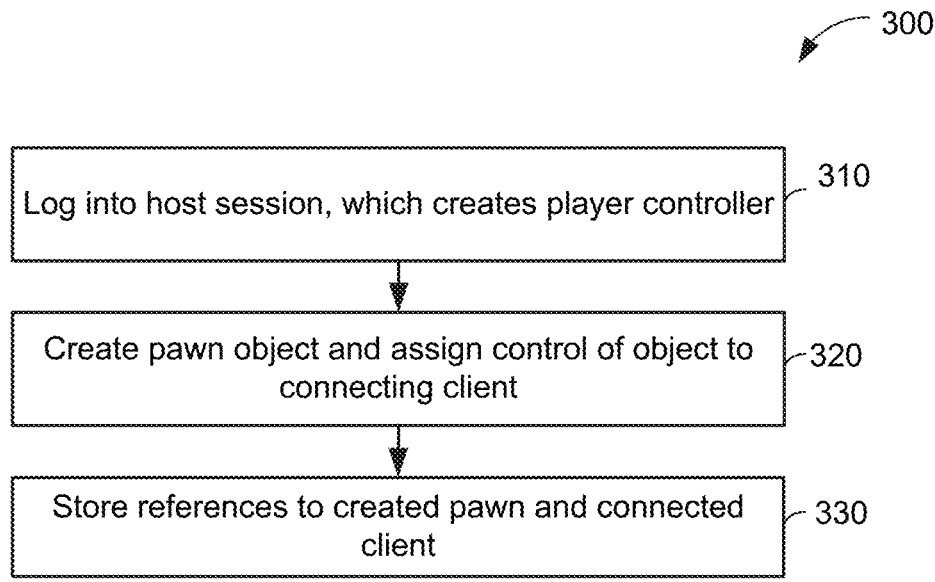
FIG. 3 depicts a method to graphically create multiplayer actors.

FIG. 3 depicts a method 300 to graphically create multiplayer actors. In step 310, the client logs in to the host session, which facilitates future communication between a client and a pawn by creating a player controller. The player controller (not shown) is an intermediary between the user's input and the user's avatar (pawn). In step 320, the host session creates a pawn object, for example, an avatar, and assigns control of the object to the connecting client. In step 330, the host stores references to internally connect the created pawn to the connected client, which allows summoning clients to find all other clients.

Figure 4:
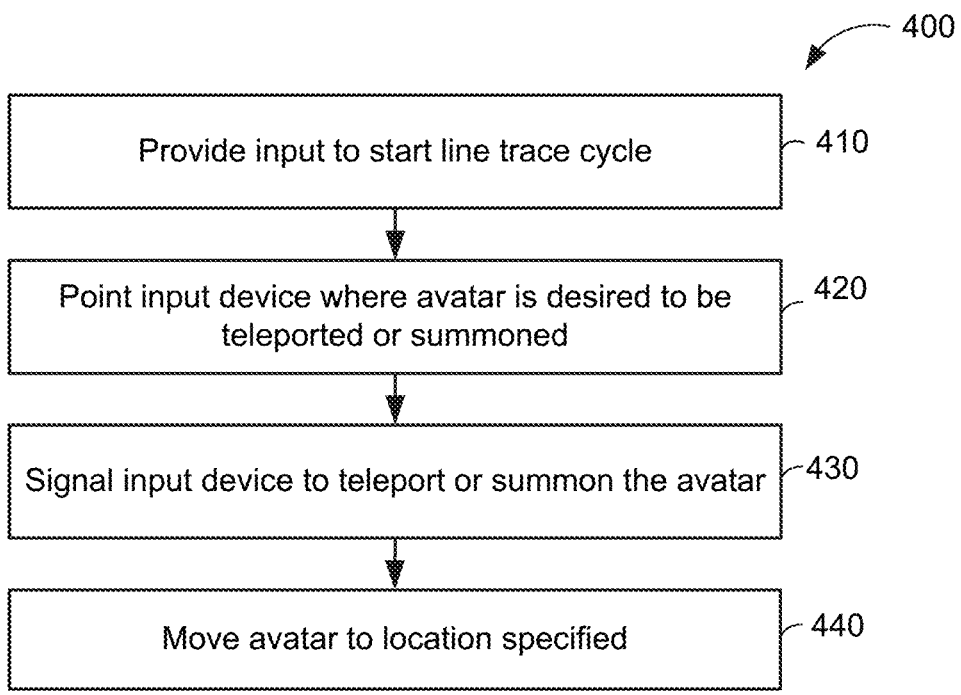
FIG. 4 describes a summoning method according to the present disclosure.

FIG. 4 describes a summoning method 400 according to the present disclosure. In step 410, the user provides the input to the input device to start the line trace cycle. The user provides input via a controller, which in one embodiment has a button that the user actuates to start the teleporting process and a button that the user actuates to start the summoning process.

In the line trace cycle, the engine automatically tests the location where the user is pointing to determine if teleportation to that location is possible. In this regard, a line is projected from the controller in the direction the user is pointing. The line trace will sample the environment to ensure that an avatar is not teleported into a wall, for example. If a user points at a location where it would not be possible for an avatar to move, the user will get a visual indication that this is a bad location. The visual indication may be a cursor not appearing, or turning a different color, or the like.

In step 420, user points the input device at a spot the avatar is desired to be teleported or summoned. In step 430, the user signals the input device to teleport or summon the summoned client. Signaling the input device is performed by the user clicking a button in one embodiment. In step 440, the avatar is teleported or summoned to the location specified.

Figure 5:
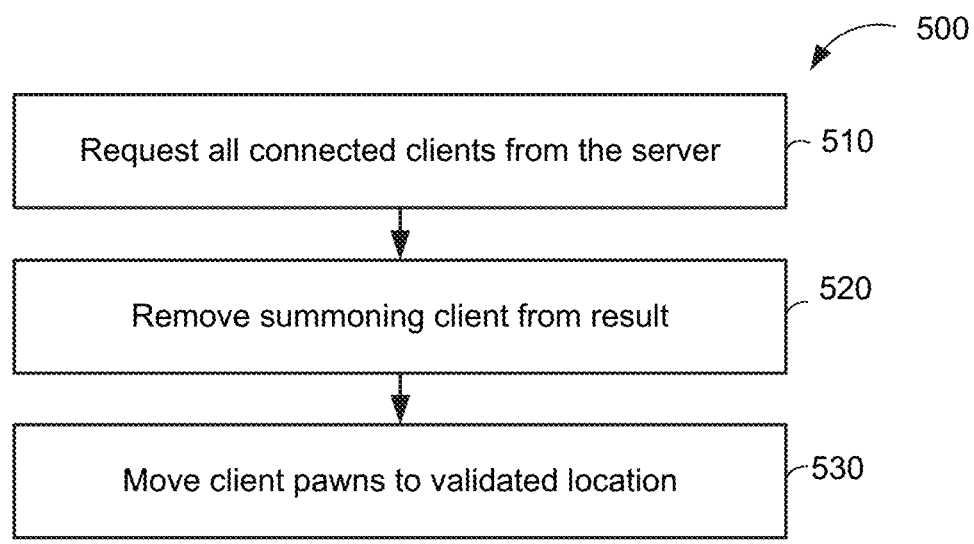
FIG. 5 describes a method of the movement of client actors, other than the summoning client.

FIG. 5 describes a method 500 of the movement of client actors other than the summoning client, during a summoning process. In step 510, the system uses the references described in step 330 above to find all clients. In step 520, the system removes the summoning client from the list. In step 530, the summoned clients are moved to the location specified the summoning client.

Figure 6:
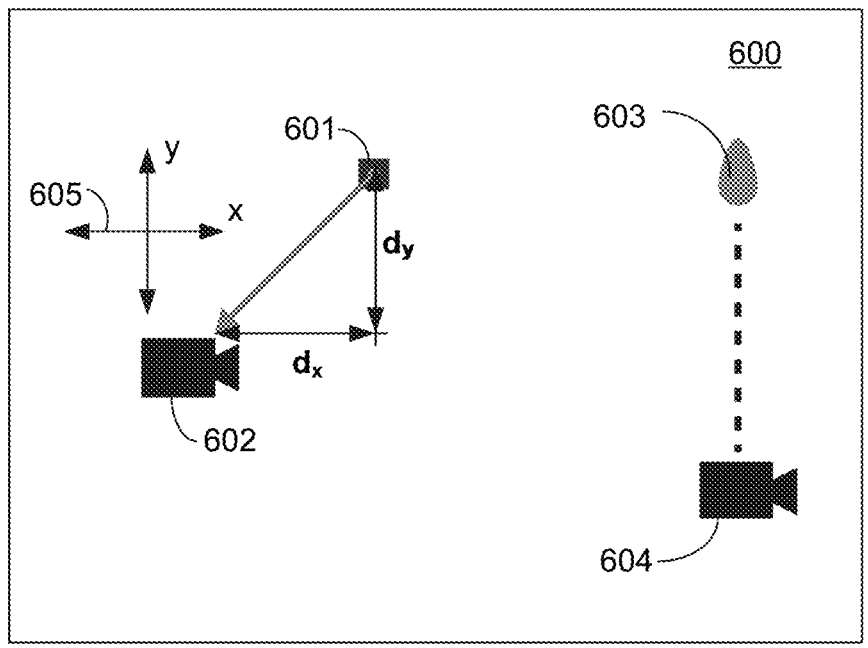
FIG. 6 is a graphical representation of a virtual space showing an original location of a summonee in the virtual space, and an original camera location associated with the summonee.

FIG. 6 is a graphical representation of a virtual space 600 showing an original location 601 of a "summonee" (i.e., a participant actor to be summoned by a summoner) in the virtual space, and an original camera location 602 associated with the summonee. The original cameral location 602 represents where a camera would be in relation to the summonee's original location 601, and is generally offset from the original location 601 in the "x" and "y" directions, as indicated by directional axis 605. Specifically, the original location 601 is offset from the camera location 602 in the x direction a distance "$-d_x$" and in the y direction a distance "$-d_y$."

A cursor 603 indicates a desired camera location that a summoner (not shown) would like to summon the summonee to. A summoner camera position 604 indicates the location of the field of view of the summoner. The summoner uses an input device to set the cursor 603 at a position where the summoner wishes the summonee to move. However, due to the offset between the summonee and the camera location discussed above, the summonee's actual position when summoned will also be offset, as discussed below with respect to FIG. 7.

Figure 7:
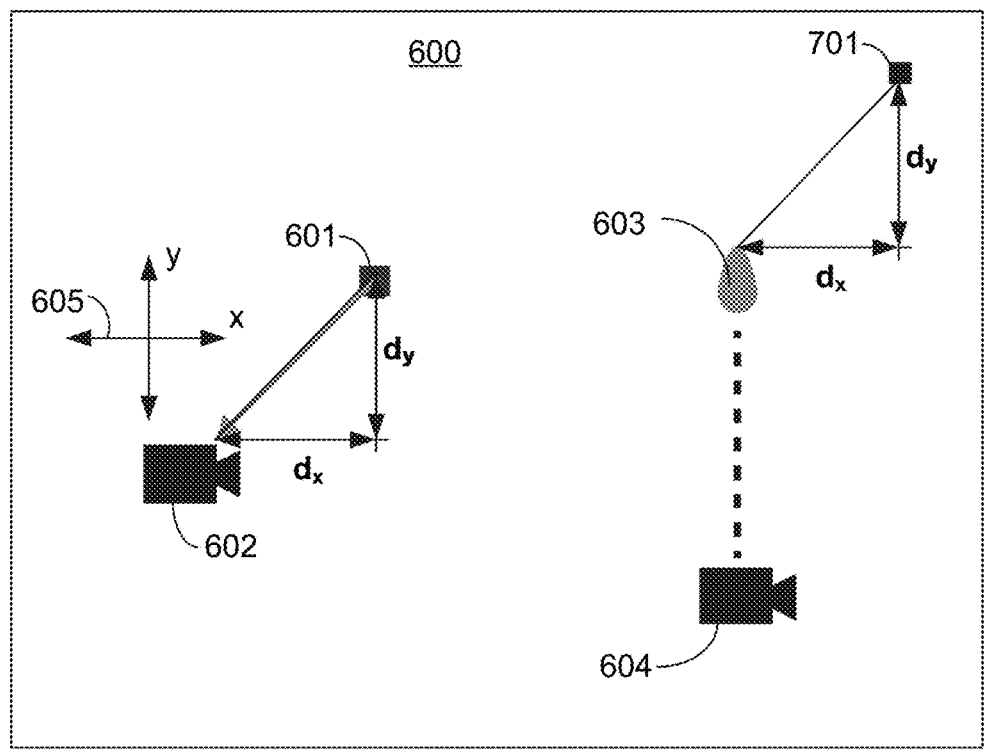
FIG. 7 is a graphical representation of the virtual space of FIG. 6 showing a new summonee location.

FIG. 7 is a graphical representation of the virtual space 600 showing the same original location 601, original camera location 602, cursor location 603, and summoner camera position 604 as in FIG. 6, and also shows a new summonee location 701 where summonee would be summoned, based on the position of the cursor 603, which represents the desired camera location for the summonee. The new summonee location 701 will be offset from the cursor 603 by the same distance $d_x$ and $d_y$ as the original location 601 is offset from the original camera location 602.

Figure 8:
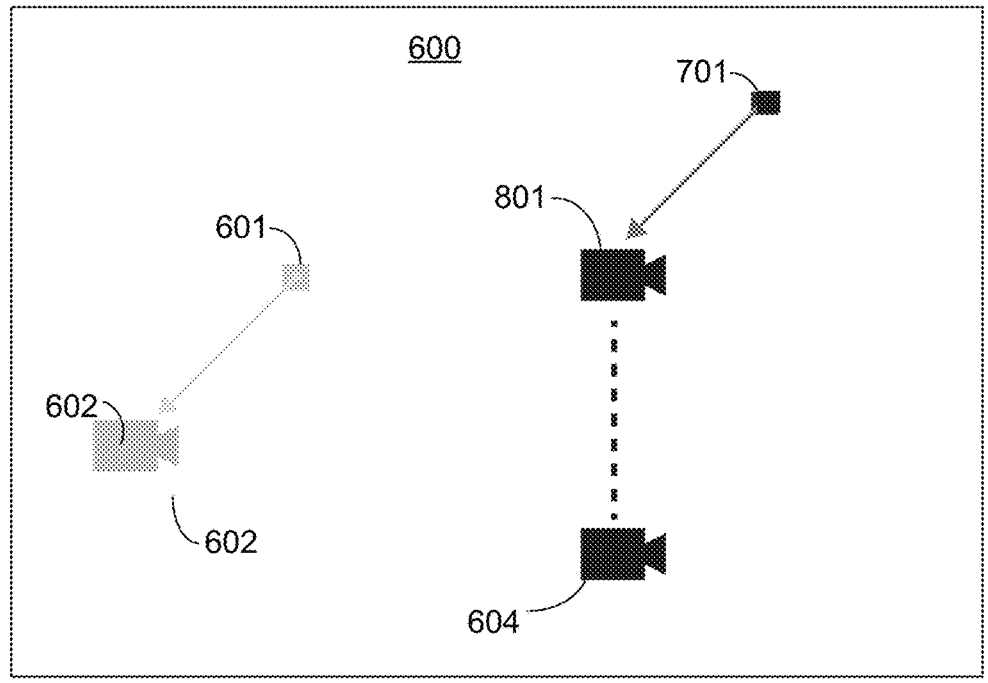
FIG. 8 is a graphical representation of the virtual space of FIG. 7, showing a new camera location where the cursor was in FIG. 7.

FIG. 8 is a graphical representation of the virtual space 600 of FIG. 7, showing a new camera location 801 where the cursor 603 was in FIG. 7. The new camera location 801 takes the place of the original camera location 602, and the field of view of the summoned has now changed to of the new camera location 801.

Figure 9:
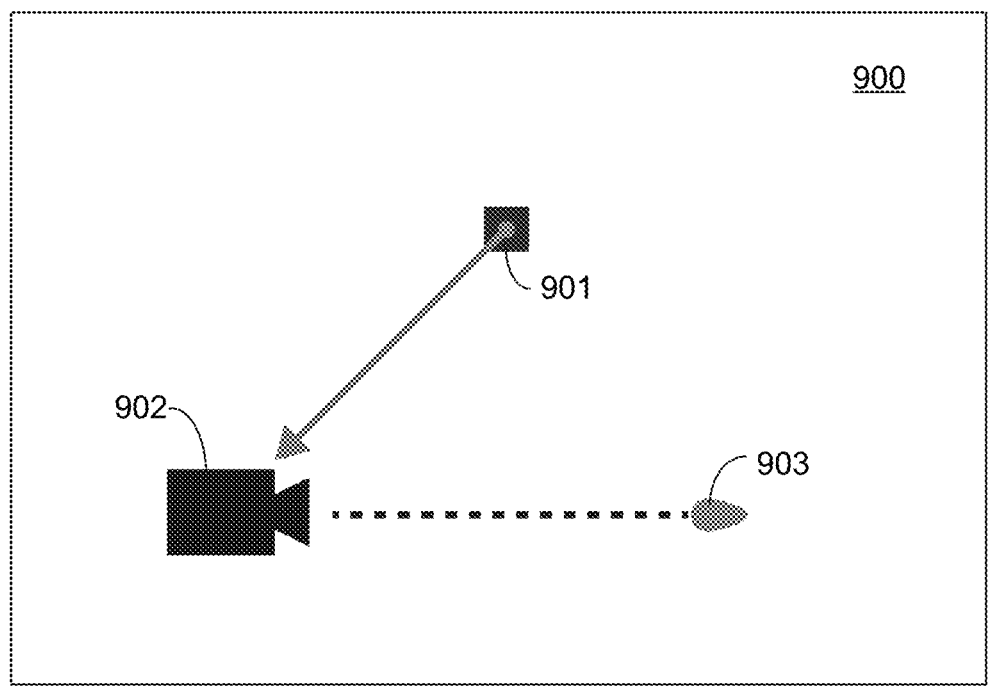
FIG. 9 is a graphical representation of a virtual space showing an original location of an actor to be teleported.

FIG. 9 is a graphical representation of a virtual space 900 showing an original location 901 of an actor, i.e., a participant in the virtual space desired to be teleported. As was discussed above with respect to FIGS. 6-8, there is an offset between the original location 901 and an original camera location 902. A cursor 903 represents a desired location of the camera.

Figure 10:
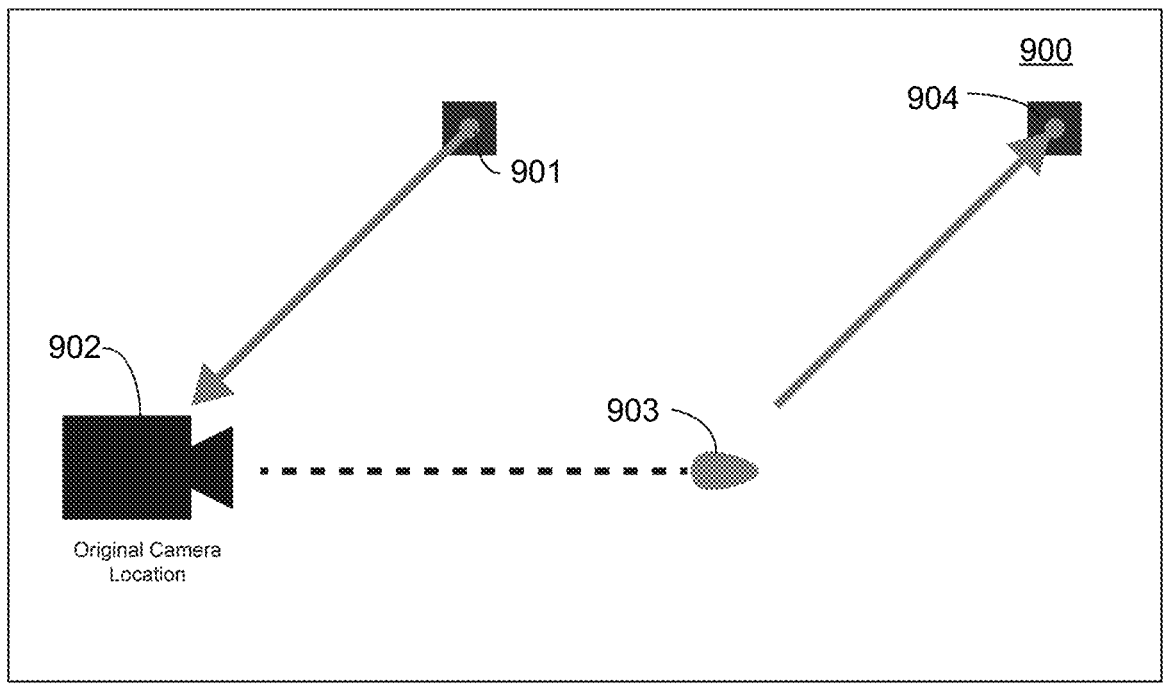
FIG. 10 is a graphical representation of the virtual space of FIG. 9, showing a new location of the actor after teleportation.
Figure 11:
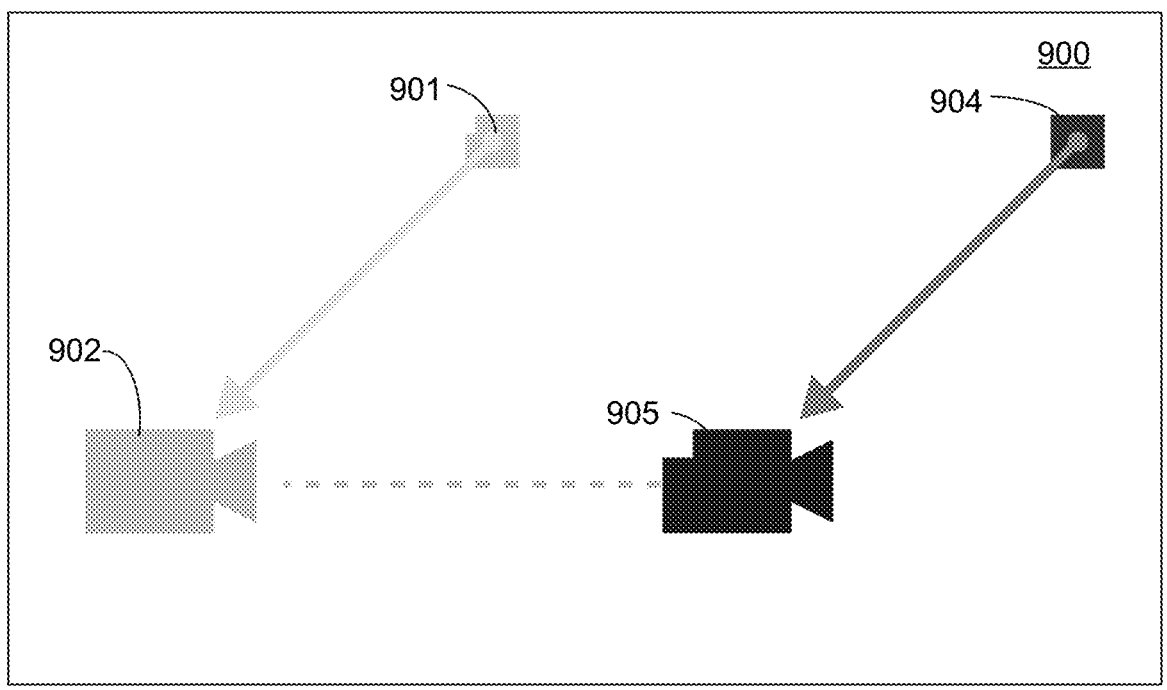
FIG. 11 is a graphical representation of the virtual space of FIG. 10, showing a new camera location where the cursor was in FIG. 10.

FIG. 10 is a graphical representation of the virtual space 900 of FIG. 9, showing a new location 904 of the actor after teleportation. FIG. 11 is a graphical representation of the virtual space 900 of FIG. 10, showing a new camera location 905 where the cursor 903 was in FIG. 10.

What is claimed is:

1. A method of moving multiplayer actors in virtual reality, comprising:
    identifying, by a first user using a user input device, a desired location in a virtual space for summoning a client;
    testing the desired location for suitability for summoning;
    identifying and storing a list of clients for possible summoning to the desired location;
    selecting one or more clients to summon to the desired location; and
    moving the selected clients to the desired location by calculating the offset in an x direction and a y direction from an original camera position and an original actor position, and compensating the desired location by the offset.

2. The method of claim 1, wherein the step of moving the selected clients to the desired location requires no action by the selected clients.

3. The method of claim 1, wherein the first user controls a first avatar via the user input device in the virtual space and causes the first avatar to perform actions in the virtual space, the virtual space comprising a second avatar, the second avatar associated with a second user, and wherein a processor moves the first avatar in the virtual space according to the actions of the first user and moves the second avatar in the virtual space according to the actions of the first user.

4. The method of claim 3, wherein the second avatar moves to the desired location upon command by the first user.

5. The method of claim 1, wherein the first user controls a first avatar via the user input device in the virtual space and causes the first avatar to perform actions in the virtual space, the virtual space comprising a plurality of other avatars, each of the other avatars associated with one of a plurality of other users, and wherein a processor moves the first avatar in the virtual space according to the actions of the first user and moves the plurality of other avatars in the virtual space according to the actions of the first user.

6. The method of claim 1, wherein the step of selecting one or more clients to move to the desired location further comprises removing a summoning client from the list.

7. A method of summoning multiplayer actors in a virtual space, comprising:
   identifying, by a user using a user input device, a desired location within the virtual space for summoning one or more clients to appear;
   testing the desired location for suitability;
   identifying and storing a list of clients for possible summoning to the desired location;
   selecting, by the user using the user input device, one or more clients to summon to the desired location; and
   without input from the selected clients, moving the selected clients to the desired location by calculating the offset in an x direction and a y direction from an original camera position and an original actor position, and compensating the desired location by the offset.

8. The method of claim 7, wherein a first user controls a first avatar via the user input device in the virtual space and causes the first avatar to perform actions in the virtual space, the virtual space further comprising a second avatar, the second avatar associated with a second user, and wherein a processor moves the first avatar in the virtual space according to the actions of the first user and moves the second avatar in the virtual space according to the actions of the first user.

9. The method of claim 7, wherein the step of selecting one or more clients to move to the desired location further comprises removing a summoning client from the list.

* * * * *